US011545921B2

(12) United States Patent
Markunas (10) Patent No.: US 11,545,921 B2
(45) Date of Patent: Jan. 3, 2023

(54) ACTIVE DAMPING OF MECHANICAL DRIVETRAIN OSCILLATIONS USING GENERATOR VOLTAGE REGULATOR

(71) Applicant: Hamilton Sundstrand Corporation, Charlotte, NC (US)

(72) Inventor: Albert Markunas, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/315,934

(22) Filed: May 10, 2021

(65) Prior Publication Data

US 2021/0351730 A1 Nov. 11, 2021

Related U.S. Application Data

(60) Provisional application No. 63/023,055, filed on May 11, 2020.

(51) Int. Cl.
*H02P 9/00* (2006.01)
*H02P 9/10* (2006.01)

(52) U.S. Cl.
CPC .................................. *H02P 9/105* (2013.01)

(58) Field of Classification Search
CPC .. H02P 9/105; H02P 2101/25; H02P 2101/30; H02P 2103/20; H02P 9/102; H02P 25/03; B64D 41/00; F02C 6/20; F05D 2220/323; F05D 2220/76
See application file for complete search history.

(56) References Cited

U.S. PATENT DOCUMENTS

| 7,557,544 | B2 | 7/2009 | Heinz et al. |
| 7,800,243 | B2 | 9/2010 | Bendixen et al. |
| 7,808,215 | B2 * | 10/2010 | Markunas ................. H02P 9/10 322/29 |

(Continued)

FOREIGN PATENT DOCUMENTS

EP 2020744 A2 2/2009

OTHER PUBLICATIONS

Extended European Search Report for EP Application No. 21173111.2, dated Sep. 23, 2021, pp. 8.

*Primary Examiner* — Julio C. Gonzalez
(74) *Attorney, Agent, or Firm* — Kinney & Lange, P.A.

(57) ABSTRACT

Apparatus and associated methods relate to active damping of mechanical oscillations of a synchronous generator's drivetrain by modulating an excitation signal provided to the synchronous generator in proper phase relation with detected mechanical oscillations so as to dampen these oscillations. The excitation signal includes a superposition of a voltage-regulation signal and an active-damping signal. The voltage-regulation signal is configured to regulate an output voltage of electrical power provided by the synchronous generator, and the active-damping signal is configured to provide active damping to the drivetrain of the mechanical system that includes the synchronous generator. The active-damping signal is generated by detecting mechanical oscillations of the drivetrain, filter such detected mechanical oscillations such that the active-damping signal has a proper phase relationship with the mechanical oscillations over a predetermined range of frequencies. This proper phase relationship is maintained over the range of frequencies using a second order lag/lead filter.

18 Claims, 7 Drawing Sheets

(56) References Cited

U.S. PATENT DOCUMENTS

| | | |
|---|---|---|
| 7,884,581 B2 | 2/2011 | Markunas et al. |
| 8,169,197 B2 | 5/2012 | Rittiger |
| 9,899,942 B2 | 2/2018 | Hurley et al. |
| 10,320,314 B2 | 6/2019 | Fox et al. |
| 2006/0232250 A1* | 10/2006 | Sihler .................... H02P 29/50 322/58 |
| 2006/0267540 A1* | 11/2006 | Chu .................... F04D 15/0066 318/778 |
| 2015/0035501 A1 | 2/2015 | Rozman et al. |
| 2016/0218650 A1 | 7/2016 | Gajanayake et al. |

\* cited by examiner

ACTIVE DAMPING OF MECHANICAL DRIVETRAIN OSCILLATIONS USING GENERATOR VOLTAGE REGULATOR

BACKGROUND

Electric generator systems convert mechanical energy generated by a prime mover to electrical energy. The prime mover is mechanically coupled to the electric generator by a mechanical drivetrain. The electrical generators generate electrical power in response to mechanical power provided to these electrical generators via the mechanical drivetrain. These electric generators can use a high-performance voltage regulator to regulate an output voltage of the electric power generated, such that the output voltage is substantially independent of variations in the mechanical speed provided to the electric generator and/or variations in the electrical loads connected thereto. Such electric generator systems are used in aircrafts.

In a typical topology, an aircraft engine generates mechanical energy that is provided through a gearbox to a synchronous generator or to multiple synchronous generators. A shaft transmits the mechanical energy from the gearbox to the synchronous generator. Due to a multitude of competing mechanical design considerations, the shaft may be relatively long and mechanically compliant. The inertias associated with the engine, the gearbox, the synchronous generator, and other gearbox driven accessories in combination with the mechanical compliance or spring rates of the mechanical drivetrain, including the generator shaft, create a distributed mechanical spring-inertia system that has associated torsional resonances. There are multiple torsional modes and associated resonances that involve the generators for multiple direct-driven generators on a common gearbox.

Engine gearboxes typically exhibit very lightly damped characteristics, and because the synchronous generator is controlled to maintain an AC voltage, it presents a near constant power load characteristic to the mechanical drivetrain that results in negative damping for disturbance frequencies that are within the generator's voltage regulation bandwidth. In certain situations, depending on the generator speed, the generator electrical load, and the net effective damping in the overall mechanical drivetrain, the torsional resonance of the spring-mass system involving the generator or generators can lead to large, undesirable torsional oscillations and mechanical failures in the system. Mechanical damping may be used to offset the negative damping characteristic of the synchronous generator or generators and thus dampen the torsional oscillations in the spring-inertia system, but mechanical damping requires additional parts that increase the weight and cost of the system.

SUMMARY

Apparatus and associated methods relate to a system for actively damping mechanical oscillations of a generator's drivetrain. The system includes a synchronous generator operatively connectable to receive, via the drivetrain, mechanical output from a prime mover and to provide electrical power in response to the mechanical output received. The system includes means for sensing the mechanical oscillations of the drivetrain. The system also includes a generator control unit (GCU) configured to selectively control an excitation signal that has a DC component and an AC component. The DC component is configured to maintain a magnitude of an output voltage of the electrical power provided. The AC component is configured to actively dampen the mechanical oscillations of a generator's drivetrain. The GCU controls, in response to the mechanical response of the drivetrain sensed, the AC component such that a phase relation of the AC component and the mechanical oscillations of the drivetrain are within a delta phase limit of a phase target over a frequency band from a lower-frequency limit through a higher-frequency limit. A ratio of the higher-frequency to lower-frequency limits exceeding 2:1.

Some embodiments relate to a method for actively damping mechanical oscillations of a generator's drivetrain. The method includes receiving, via the drivetrain, mechanical input from a prime mover. The method includes providing, via a synchronous generator operatively connectable to the drivetrain, electrical power in response to the mechanical input received. The method includes sensing a mechanical response of the drivetrain to the mechanical input received. The method also includes selectively controlling, via a generator control unit (GCU), an excitation signal that has a DC component and an AC component. The DC component is configured to maintain a magnitude of an output voltage of the electrical power provided. The AC component is configured to actively dampen the mechanical oscillations of a generator's drivetrain. Selectively controlling the excitation signal includes controlling a phase relation of the AC component and the mechanical oscillations of the drivetrain to be within a delta phase limit of a phase target over a frequency band from a lower-frequency limit through a higher-frequency limit. A ratio of the higher-frequency to lower-frequency limits exceeds 2:1.

DETAILED DESCRIPTION

Apparatus and associated methods relate to active damping of mechanical oscillations of a synchronous generator's drivetrain by modulating an excitation signal provided to the synchronous generator in proper phase relation with detected mechanical oscillations so as to dampen these oscillations. The excitation signal includes a superposition of a voltage-regulation signal and an active-damping signal. The voltage-regulation signal is configured to regulate an output voltage of electrical power provided by the synchronous generator, and the active-damping signal is configured to provide active damping to the drivetrain of the mechanical system that includes the synchronous generator. The active-damping signal is generated by detecting mechanical oscillations of the drivetrain, filter such detected mechanical oscillations such that the active-damping signal has a proper phase relationship with the mechanical oscillations over a predetermined range of frequencies. This proper phase relationship is maintained over the range of frequencies using a second order lag/lead filter.

A synchronous generator is controlled by a generator control unit (GCU) so as to provide output power that has an output voltage within a specified range substantially independent of electrical loads connected thereto and substantially independent of gradual increases and decreases in the speed of the generator associated with normal engine operation. In general, the generator control unit (GCU) regulates the output voltage of the synchronous generator by controlling an excitation signal provided to the synchronous generator. In addition, the generator control unit (GCU) controls the excitation voltage provided to the synchronous generator so as to provide active damping of mechanical oscillations of a drivetrain of the synchronous generator. The generator control unit provides such active damping by monitoring a mechanical output of the drivetrain (e.g., rotational frequency) associated with the synchronous generator and detecting oscillations thereof that are indicative of mechanical oscillations (e.g., torsional oscillations). In response to the detected oscillations, the generator control unit dynamically modifies the excitation signal provided to the synchronous generator such that the torque associated with the generator is dynamically varied. By dynamically varying the torque in proper phase relationship to the mechanical oscillations the synchronous generator can provide active or positive damping that dampens or reduces the mechanical oscillations in the drivetrain of the synchronous generator. A benefit of using such electrical means to provide active damping (e.g., as opposed to mechanical means) is that no additional hardware or mechanical components are required.

Figure 1:
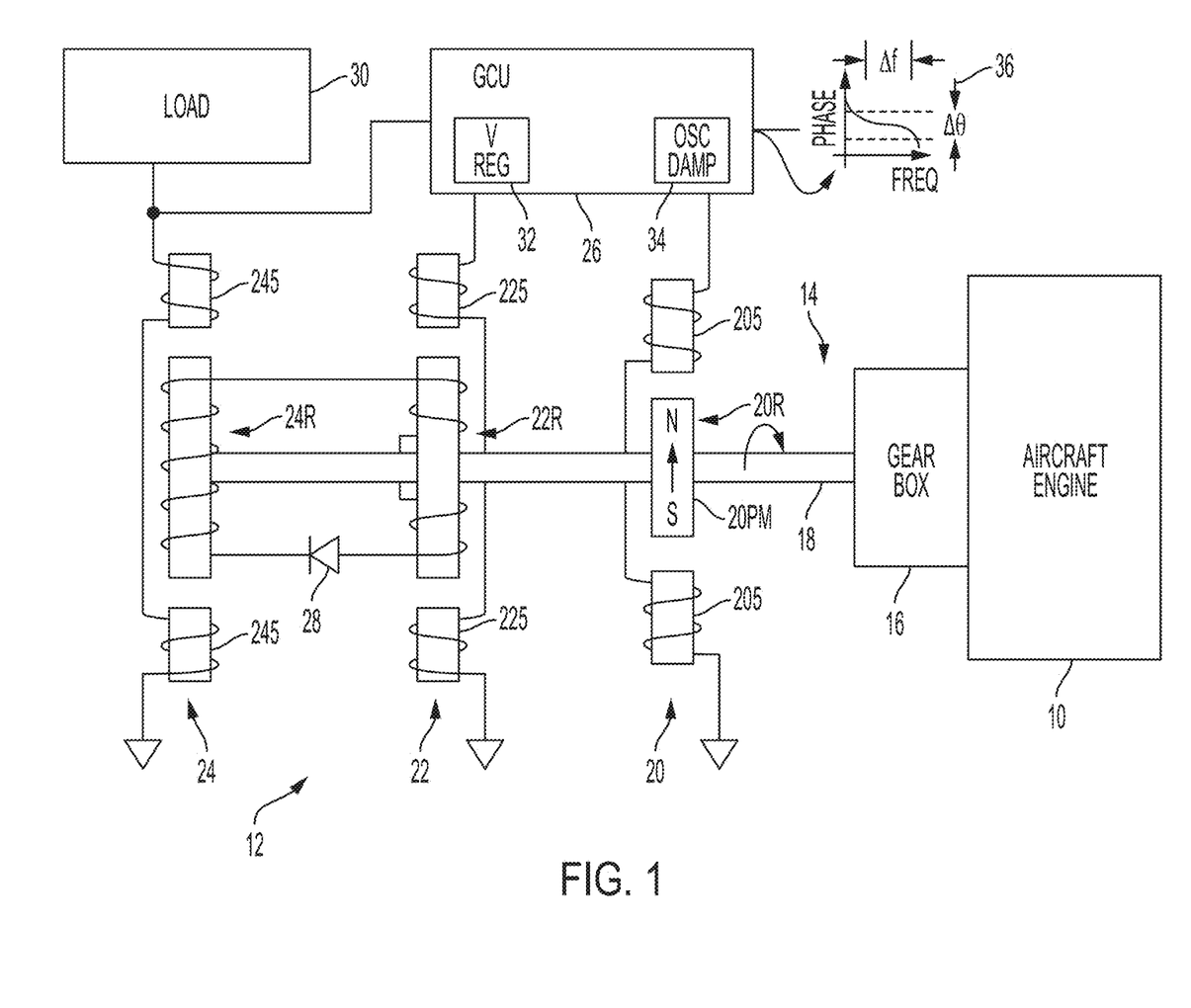
FIG. 1 illustrates a system for converting mechanical power generated by an aircraft engine to electrical power.

FIG. 1 illustrates a system for converting mechanical power generated by an aircraft engine to electrical power. In FIG. 1, aircraft engine 10 is mechanically coupled to synchronous generator 12 via drivetrain 14. Drivetrain 14 includes gearbox 16 and rotatable shaft 18. Gearbox 16 can be configured to receive a mechanical input from aircraft engine 10 (e.g., energy generated by aircraft engine 10 mechanically transmitted to gearbox 16), which operates as a prime mover for synchronous generator 12. Aircraft engine 10 can produce such a mechanical input using any number of well-known methods (e.g., aircraft engine 10 can be a gas turbofan engine, a turboprop engine, etc.). Also, gearbox 16 can convert the mechanical input received to rotate rotatable shaft 18 in various manners. Although it is not uncommon in direct-driven systems to rotate rotatable shaft 16 using a gearbox to scale the speed provided by aircraft engine 10, mechanical energy can be provided to synchronous generator 12 in a variety of other ways. Thus, gearbox 14 can be configured to transmit and/or convert the received mechanical input to rotation of rotatable shaft 18.

Rotatable shaft 18, in turn, transmits mechanical energy provided by gearbox 14 (or other mechanical intermediary between aircraft engine 10 and synchronous generator 12) to synchronous generator 12. Thus, drivetrain 14 receives the mechanical input from aircraft engine 10 and provides a mechanical output to synchronous generator 12. Various mechanical oscillations can occur within drivetrain 14. When such mechanical oscillations occur, the mechanical input and the mechanical output are not perfectly synchronized, but instead the mechanical output will oscillate about a target operating point corresponding to the mechanical input. Such oscillations can cause fatigue and even failure of drivetrain 14.

For example, torsional oscillations can occur in rotatable shaft 18. Such torsional oscillations can be indicated by a rotational frequency at an output location (e.g., where rotatable shaft 18 engages synchronous generator 12) of rotatable shaft 18 differing from a rotational frequency at an input location (e.g., where rotatable shaft 18 engages gear box 16) of rotatable shaft 18. Such torsional oscillations can be induced in rotatable shaft 18, for example, in response to a sudden increase (or decrease) in the electrical load powered by synchronous generator 12. Furthermore, if such rotational oscillations are at a natural frequency of rotatable shaft 18, these rotational oscillations can be sustained by variations of mechanical energy as generated by aircraft engine 10. Similarly, gear box 16 (or other intermediary mechanical systems) can be susceptible to mechanical oscillations therein.

Synchronous generator 12 is configured to convert the mechanical energy provided thereto as the mechanical output of drivetrain 14 into electrical energy. In the depicted embodiment, synchronous generator 12 includes permanent magnet generator (PMG) 20, excitation generator 22 and main generator 24. Permanent magnet generator (PMG) 20 includes stator 20S and rotor 20R upon which permanent magnet 20PM is affixed. Rotor 20R is mechanically coupled to rotatable shaft 18 so as to rotate at the same rate of rotation as rotatable shaft 18. In some embodiments, the PMG is gear driven from shaft 18. As rotatable shaft rotates, rotor 20R rotates, which in turn causes rotation of permanent magnet 20PM. Rotor 20R is in close proximity with stator 20S and is configured to rotate a magnetic field generated by permanent magnet 20PM. Stator 20S has windings in which AC electrical voltage is induced in response to rotation of the magnetic field generated by permanent magnet 20PM. Thus, PMG 20 is configured to generate AC electrical power in response to rotation of rotatable shaft 18.

At least a portion of this generated AC electrical power is provided to generator control unit (GCU) 26. This AC electrical power, which is generated by PMG 20 can provide operating power for GCU 26 and for various other purposes. For example, an excitation signal can be generated by GCU 26 and then provided to excitation generator 22. The electrical power associated with this excitation signal can be supplied by the AC electrical power generated by PMG 20. Furthermore, a frequency of the AC electrical power generated by PMG 20 can be indicative of the rotation frequency of rotatable shaft 18 at the location where rotatable shaft 18 is coupled to rotor 20R of PMG 20 This Rotation of rotatable shaft 18 at such a location corresponds to the mechanical output of drivetrain 14. This rotation frequency, as indicated by the variation in the frequency of the AC electrical power generated by PMG 20, can be used to determine if mechanical oscillations are present in drivetrain 14.

GCU 26 then provides the generated excitation signal to stator windings 22S of excitation generator 22. This excitation signal, which is provided by GCU 26, in turn generates a magnetic field that intersects rotor 22R of excitation generator 22. In response to rotation of rotatable shaft 18, this generated magnetic field induces an AC electrical voltage in windings of rotor 22R of excitation generator 22. The resulting AC electrical current is rectified by rectifier 28 and delivered to windings of rotor 24R of main generator 24. The current conducted through the windings of rotor 24R generate a magnetic field that intersects stator 24S of main generator 24. In response to rotation of rotatable shaft 18, this generated magnetic field induces an AC electrical voltage in windings of stator 24S of main generator 24, so as to generate electrical power for used by various electrical systems of the aircraft, such as, for example, load 30.

GCU 26 can be configured to provide various control functions of the system depicted in FIG. 1. For example, GCU 26 can be configured to control the electrical power generated by synchronous generator 12, such that an output voltage of the electrical power is controlled within a specified electrical voltage range usable to electrical load(s) 30 of the aircraft. To maintain the output voltage within the specified voltage range, GCU 26 can monitor the magnitude of the output voltage and compare this monitored magnitude with a target magnitude (e.g., 115 Volts Root-Mean-Square or RMS). This magnitude can be controlled by controlling a magnitude of the excitation signal that is electrically communicated to the stator windings of stator 22S of excitation generator 22. Therefore, GCU 26 can regulate the excitation signal provided to excitation generator 22. In some embodiments, GCU 26 can be programmed with a voltage set-point that defines a target root-mean-square (RMS) magnitude of the output voltage of the electrical power generated by main generator 24. In this way, GCU 26 can maintain the magnitude of the output voltage to within a delta voltage of the target RMS magnitude as defined by the voltage set-point. In some embodiments, the generator electrical system can have one or more transformer/rectifier unit(s) to provide DC power which is then regulated by GCU 26.

GCU 26 can also be configured to electrically cause active or positive damping of any mechanical oscillations in drivetrain 14. Various types of mechanical oscillations can occur in drivetrain 14. For example, engine 10, drivetrain 14, and synchronous generator 12 form a spring-inertia system that has the potential to generate torsional oscillations within rotatable shaft 18. Such mechanical oscillations can be detected by sensing the mechanical output of drivetrain 14. For example, a rotation frequency corresponding to the mechanical output can be determined based on a frequency of the AC electrical power generated by PMG 20. Periodic variations of the frequency of the AC electrical power generated by PMG 20 can be indicative of mechanical oscillations, for example.

In some embodiments, in addition to sensing the mechanical output of drivetrain 14, the mechanical input of drivetrain 14 can also be sensed, and both the sensed mechanical input and output can be used to determined mechanical oscillations of drivetrain 14. Such mechanical inputs provided by aircraft engine 10, however, typically have very small (if any) oscillations due to the large inertia associated with aircraft engines. Mechanical oscillations within drivetrain 14 can result in periodic differences between rotational frequencies corresponding to the mechanical input and output of drivetrain 14. To electrically cause such active or positive damping, GCU 26 can generate a modulated portion of (or superimpose a modulated signal onto) the excitation signal generated thereby so as to be in a proper phase relation (i.e., a phase relation configured to dampen the mechanical oscillations) with the detected AC electrical power generated by PMG 20. In the FIG. 1 embodiment, GCU 26 includes both voltage regulator 32 and a mechanical oscillation damping subsystem 34. The proper phase relation (or phase target) can depend on the impedance characteristics of the composite electrical load over all possible load conditions experienced during an aircraft flight mission.

As described above, to dampen mechanical oscillations, proper phase relation must be maintained between the modulated portion of the excitation signal generated (or superimposed modulated signal) and the mechanical oscillations as detected by GCU 26 must be maintained. Phase/frequency relation 36 of such a modulated portion shows that within frequency band Δf the phase relation is within an effective phase band Δθ, such that effective damping of mechanical oscillations results. In the depicted phase/frequency relation 36, a ratio of a higher-frequency extremum to a lower-frequency extremum defining the frequency band Δf exceeds 2:1, or 3:1 for example. Such a broad bandwidth of effective damping facilitates effective damping of various systems having various mechanical configurations, as well as various modes of mechanical oscillations. The phase band Δθ maintained over the frequency band Δf can be 5, 10, 12, or 15 degrees, for example (i.e., +/1 2.5, 5, 6, or 7.5 degrees).

In addition to sensing the rotation frequency of the rotatable shaft base on the frequency of the AC electrical power generated by PMG 20, as described above, GCU 26 can include various other means for sensing mechanical oscillations in the drivetrain. For example, a rotation sensor(s) can be affixed to a location(s) along rotatable shaft 18. Such a rotation sensor can be an optical sensor, a magnetic sensor, a proximity sensor, etc. Such a rotation sensor can be configured to sense a rotational frequency of a rotatable shaft, for example. In other embodiments, a sensor can be configured to measure the mechanical input of drivetrain 14. In some embodiments a vibration sensor can be configured to sense vibrations associated with the mechanical oscillations. In some embodiments a torque sensor can be used to sense torque in drivetrain 14. GCU 26 can be configured to receive signals from such sensors, and to determine mechanical oscillations of drivetrain 14, based on these received signals.

The FIG. 1 embodiment is simplified in various manners. For example, in many embodiments, main generator 24 is configured to generate three-phase AC power. In some embodiments, PMG 20 and/or excitation generator is configured as a three-phase generator(s) as well. To perform such three-phase electrical power generation, multiple armature windings are arranged in physical phase relation about synchronous generator 12. Furthermore, synchronous generator can further include an output regulator to provide various types of electrical power (e.g., 28 Volt DC, and various others). In some embodiments, rectifier 28 can be a single diode as depicted, but generally rectifier 28 includes a bridge rectifier, either of full wave or half wave varieties.

Figure 2:
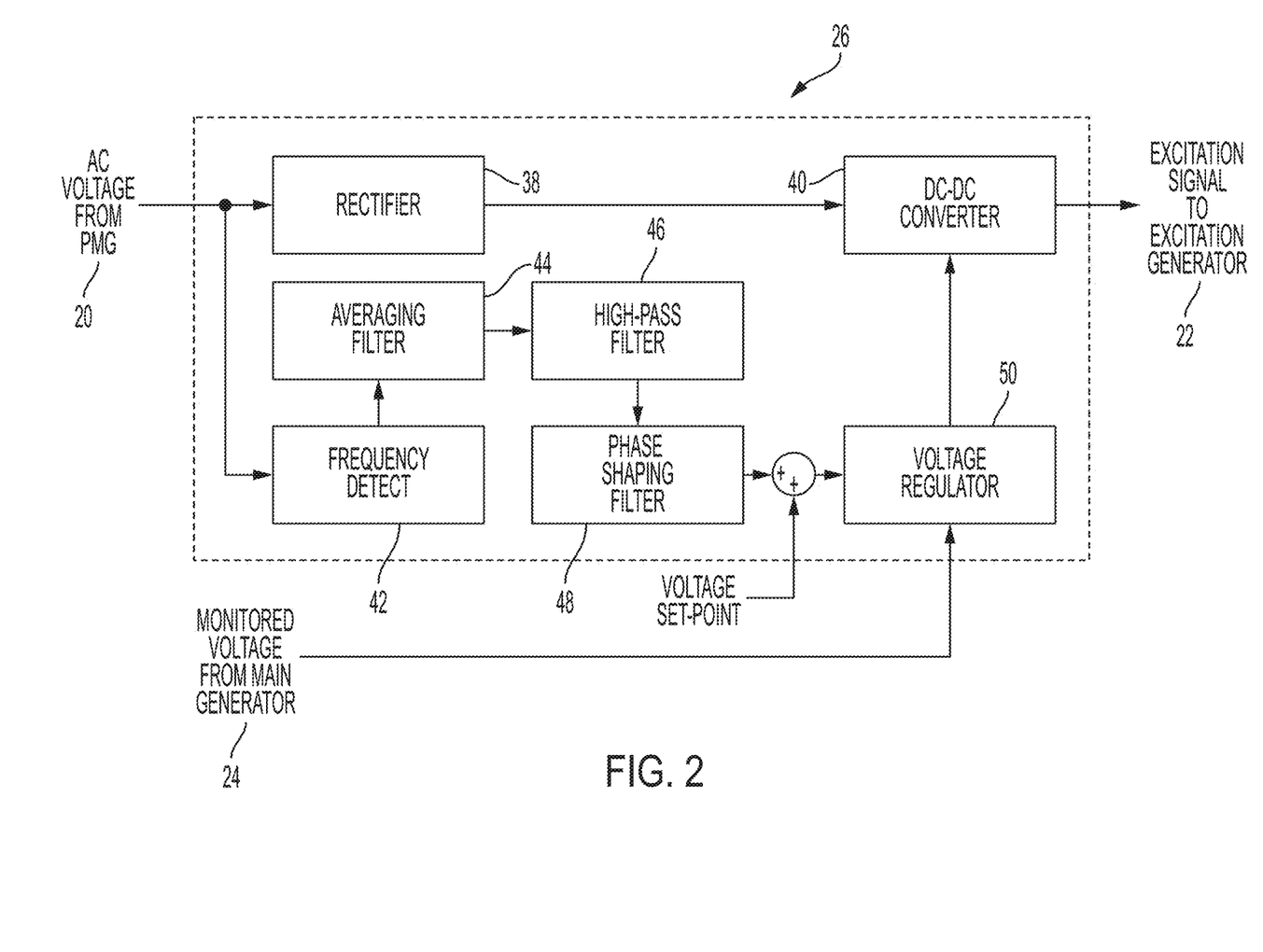
FIG. 2 is a block diagram illustrating functions performed by the generator control unit to provide active damping to the system.

FIG. 2 illustrates an exemplary embodiment of the functional operations performed by GCU 26 to provide active damping of mechanical oscillations in drivetrain 14 of synchronous generator 12. GCU 26 can be implemented in various manners, such as, for example, by a microprocessor or digital signal processor (DSP) that performs the functions illustrated in FIG. 2 using a combination of software and hardware components, such as, for example, an FPGA. In other embodiments, the functions illustrated in FIG. 2 can be implemented using various analog devices. In addition, functional operations shown in FIG. 2 are limited to those functions related to providing active damping of mechanical oscillations in drivetrain 14. In other embodiments, GCU 26 can include additional functionality beyond those functions illustrated in FIG. 2.

As shown in FIG. 2, GCU 26 includes rectifier 38, DC-DC converter 40, frequency detector 42, averaging filter 44, high-pass filter 46, phase-shaping filter 48, and voltage regulator 50. Rectifier 38 rectifies the voltage of the AC electrical power generated by PMG 20 (as shown in FIG. 1) to a DC voltage that is provided to DC-DC converter 40. In the situation in which no torsional oscillations are detected, voltage regulator 50 acts to control the magnitude of the DC output voltage generated by DC-DC converter 40 based on the voltage set-point value and the monitored output voltage generated by main generator 24. By selectively increasing or decreasing the output voltage generated by DC-DC converter 40 the output voltage generated by main generator 24 can be selectively controlled to a desired level. The operations performed by GCU 26 illustrate a simple model used to maintain the output voltage of main synchronous generator 12 at a desired level. In other embodiments, more complex algorithms and additional inputs may be used to control the output voltage of main synchronous generator 12.

Figure 3A:
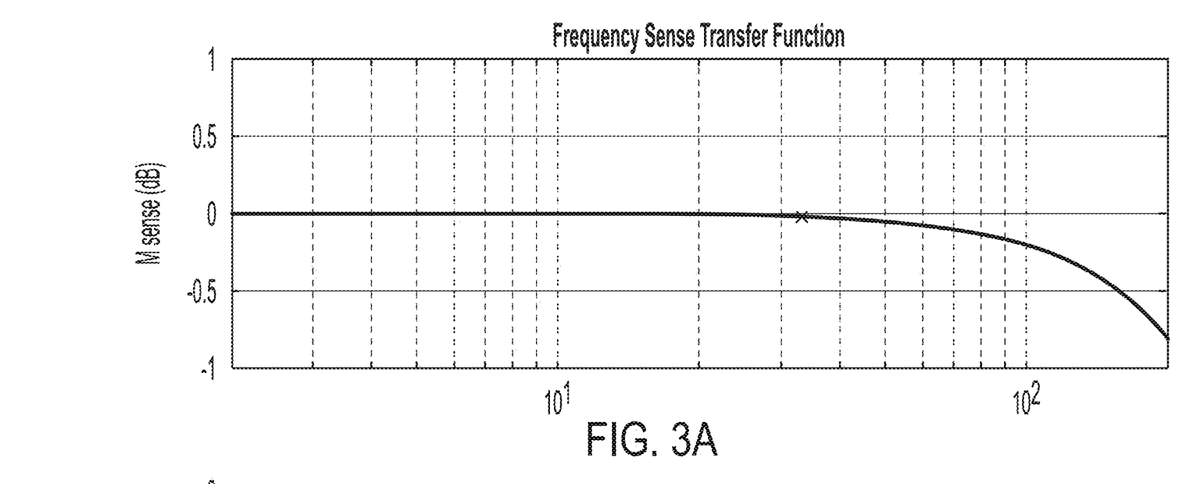
FIGS. 3A and 3B depict magnitude and phase angle, respectively, of a Bode plot of the frequency detector for a 1200 Hz rotation frequency of rotatable shaft 18.
Figure 3B:
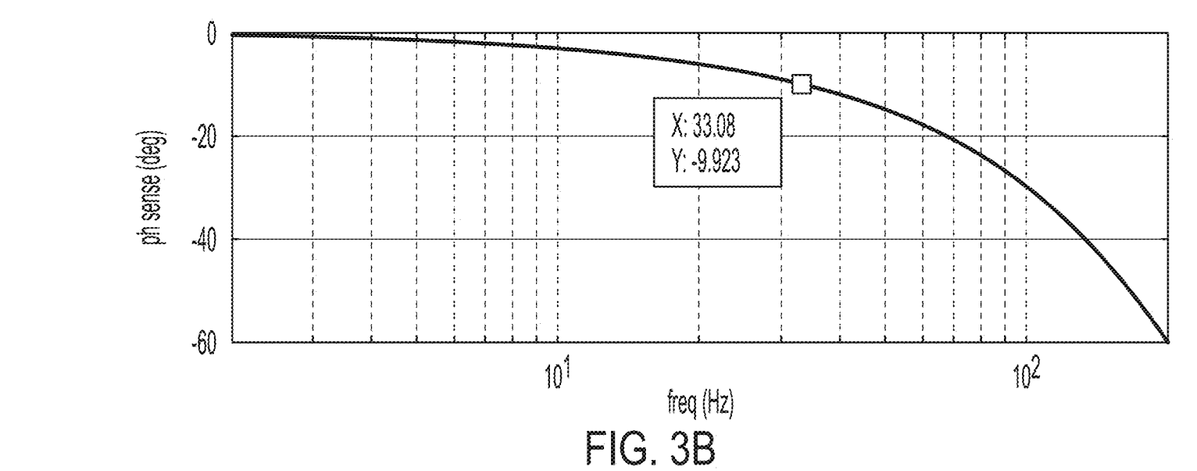

In addition, the AC output voltage generated by PMG 20 is provided to frequency detector 42. Because the signal provided by PMG 20 is an alternating current signal with a frequency that is directly related to the rotation frequency of rotatable shaft 18, frequency detector 42 is able to determine the actual rotation frequency of the mechanical output of rotatable shaft 18. Such frequency detection can be based on the zero-crossings (i.e., the frequency with which the AC output voltage crosses the value zero), for example. In some embodiments, frequency detector 42 can include a high-frequency clock that measures the period between successive zero crossings of the AC output voltage of PMG 20. Measuring the period between successive zero crossings can permit frequency detector 42 to determine the actual rotation frequency of rotatable shaft 18. Such frequency detection can be approximated by the following mathematical expression of its frequency response:

$$G_{fsense} \cong \frac{1-\exp(-T \cdot s)}{T \cdot s} \cdot \frac{1-\exp(-T \cdot s)}{T \cdot s}, \quad (1)$$

where T is the time between AC waveform zero crossings. FIGS. 3A and 3B depict magnitude and phase angle, respectively, of a Bode plot of the frequency detector for a 1200 Hz rotation frequency of rotatable shaft 18. The red x marks the drivetrain resonant frequency of 33 Hz (e.g., 33 in this example might represent a resonant frequency of drivetrain 14). Note, the phase angle at 33 Hz is approximately ~10 degrees. Because T is inversely dependent of the rotational frequency of rotatable shaft 18, the transfer function expressed by equation (1) is expressly dependent on rotation frequency as indicated by the parameter T. However, since the resulting phase lag (i.e., ~10 degrees) is relatively small compared to the phase lags corresponding to other elements of the algorithm, this effect is not dominant and likely will not require scheduling the algorithm parameters with generator speed.

Averaging filter 44 receives a signal indicative of rotation frequency, as generated by frequency detector 42. In some embodiments, averaging filter 44 can be a low-pass filter, which has a frequency response of:

$$G_{avg} = \frac{1}{T_{avg} \cdot s + 1} \quad (2)$$

Figure 4A:
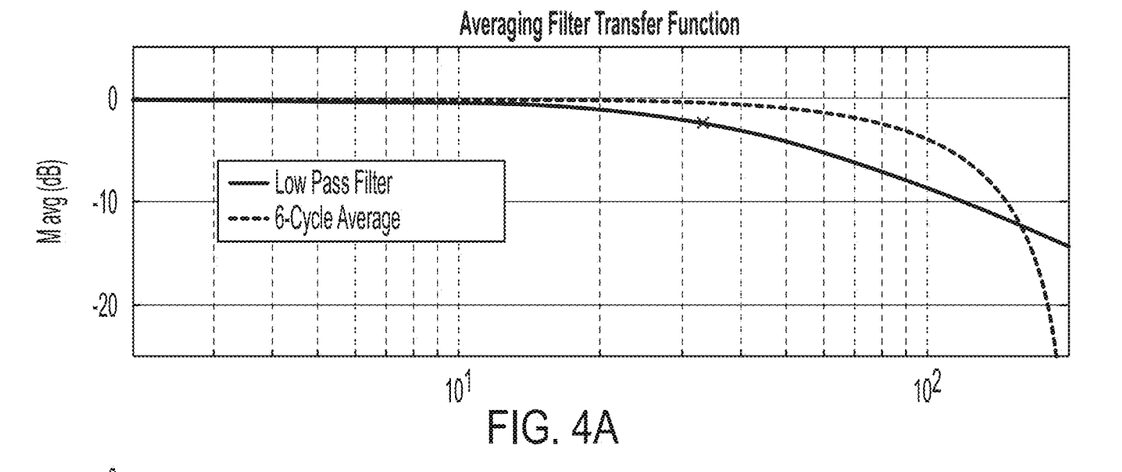
FIGS. 4A and 4B depict magnitude and phase angle, respectively, of a Bode plot of the $1^{st}$ order low pass filter (LPF) with a 40 Hz bandwidth.
Figure 4B:
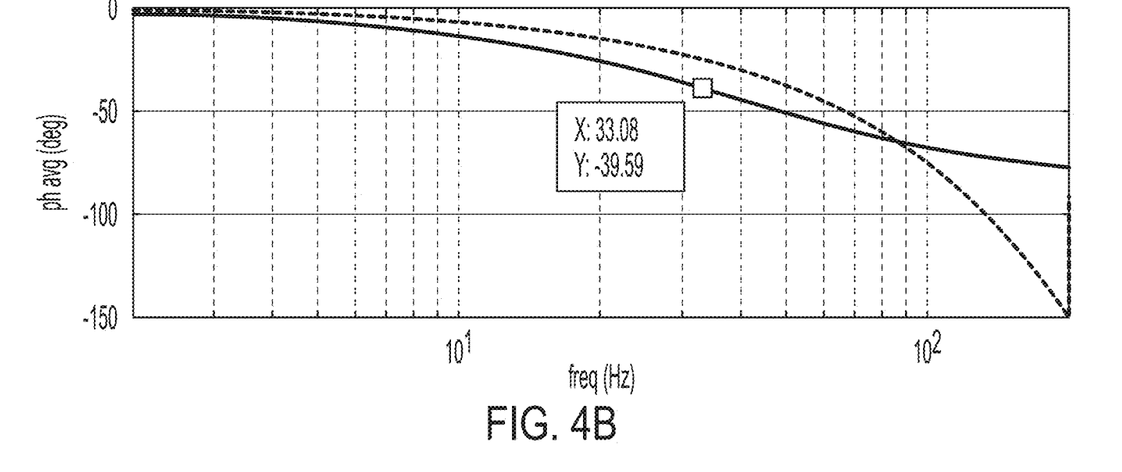

FIGS. 4A and 4B depict magnitude and phase angle, respectively, of a Bode plot of the $1^{st}$ order low pass filter (LPF) with a 40 Hz bandwidth. Prior art embodiments would employ a 6-cycle averaging filter for a 12-pol PMG (or a 9-cycle averaging filter for an 18-pole PMG) instead of a low-pass filter. The LPF is a much simpler solution to the 6-cycle averaging filter. The phase of the 6-cycle averaging filter changes with generator frequency, whereas the phase of the LFP is independent of the generator frequency. This independency of the phase with respect to generator frequency prevents the requirement of scheduling the phase shaping filter parameters with generator frequency so as to maintain effective damping over the entire speed range. The LPF phase response at the resonant frequency of drivetrain 14 (i.e., at 33 Hz) is approximately −40 degrees. As a comparison, the transfer function of the 6-cycle average is given in magenta. Note that the attenuation of the LPF is greater than that of the 6-cycle average out to about 160 Hz. The phase lag for the LPF is also larger out to about 86 Hz.

High-pass filter 46 receives the signal indicative of rotation frequency, as filtered by averaging filter 44. In some embodiments, high-pass filter 46 can be a $2^{nd}$ order high-pass filter (HPF), which has a frequency response of:

$$G_{hpf} = \frac{s^2}{s^2 + 2\zeta_{hpf}\omega_{hpf} \cdot s + \omega_{hpf}^2} \quad (3)$$

Figure 5A:
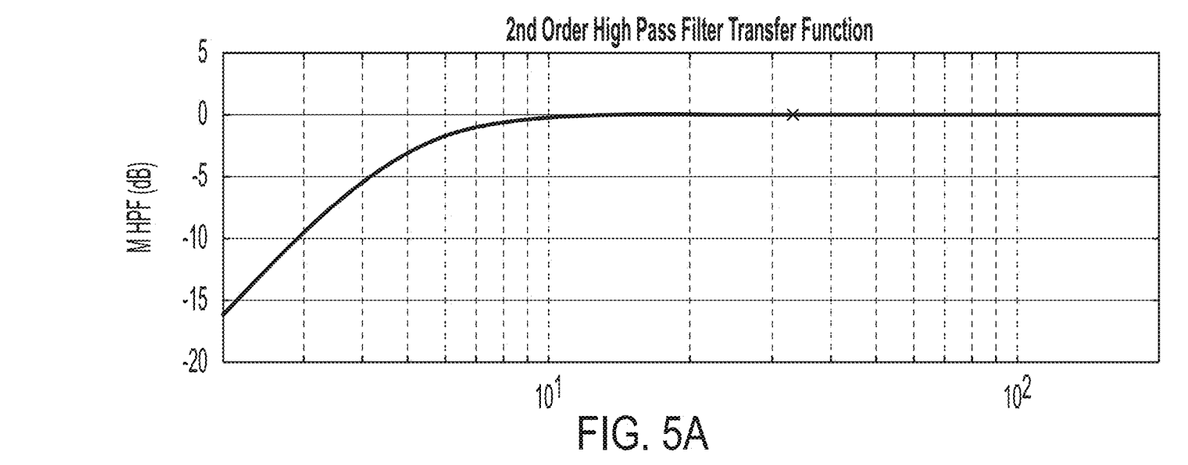
FIGS. 5A and 5B depict magnitude and phase angle, respectively, of a Bode plot of a high-pass filter with a 5 Hz natural frequency and a damping ratio of 0.7071.
Figure 5B:
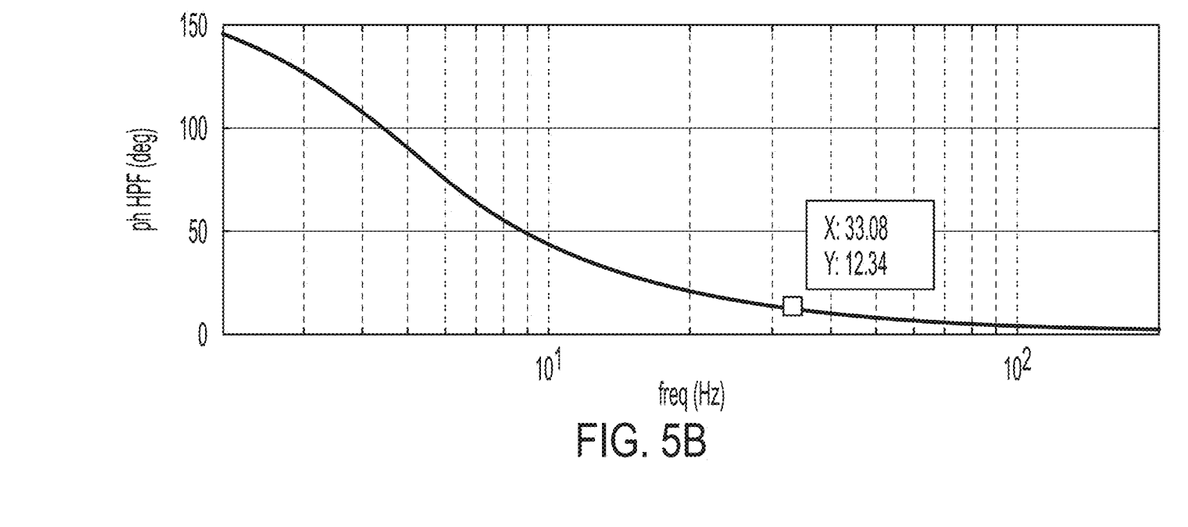

Note that this $2^{nd}$ order high-pass filter is configured to have unity gain at high frequencies. FIGS. 5A and 5B depict magnitude and phase angle, respectively, of a Bode plot of a high-pass filter with a 5 Hz natural frequency and a damping ratio of 0.7071. The phase at 33 Hz is approximately +12 degrees. High-pass filter 46 is configured to reject slow speed changes and slow accelerations changes when modulating the voltage regulator output. Without such a $2^{nd}$ order filter, such as high-pass filter 46, such slow changes in speed and/or acceleration could be passed to the output signal of GCU 26, thereby causing the synchronous generator 12 to attempt to compensate for engine speed changes commanded by a pilot or autopilot. For example, if only a $1^{st}$ order high-pass filter were to be used, slow accelerations of engine speed would be passed to the output signal.

Phase-shaping filter 48 receives the signal indicative of rotation frequency, as filtered by both averaging filter 44 and high-pass filter 46. Phase shaping filter 48 ensures that the proper phase relation exists over a broad bandwidth of frequencies that include the frequencies in which mechanical oscillations of drivetrain 14 can occur. This proper phase relation facilitates active damping of such mechanical oscillations that are within the broad band of frequencies of interest. The general form is a $2^{nd}$ order lag/lead given by:

$$G_{ps} = \frac{s^2 + 2\zeta_{ps2}\omega_{ps2} \cdot s + \omega_{ps2}^2}{s^2 + 2\zeta_{ps1}\omega_{ps1} \cdot s + \omega_{ps1}^2} \quad (4)$$

A more convenient form for tuning with the given HPF and averaging LPF is:

$$G_{ps} = \frac{s^2 + 2\zeta_{ps2}\omega_{ps2} \cdot s + \omega_{ps2}^2}{(s + \omega_{ps1}) \cdot (s + \omega_{ps3})} \quad (5)$$

Figure 6A:
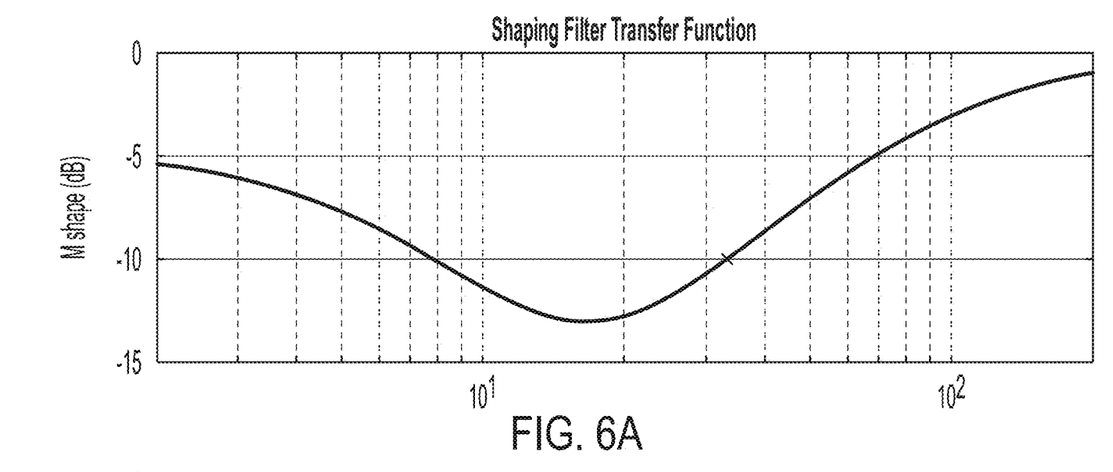
FIGS. 6A and 6B depict magnitude and phase angle, respectively, of a Bode plot of phase-shaping filter 48.
Figure 6B:
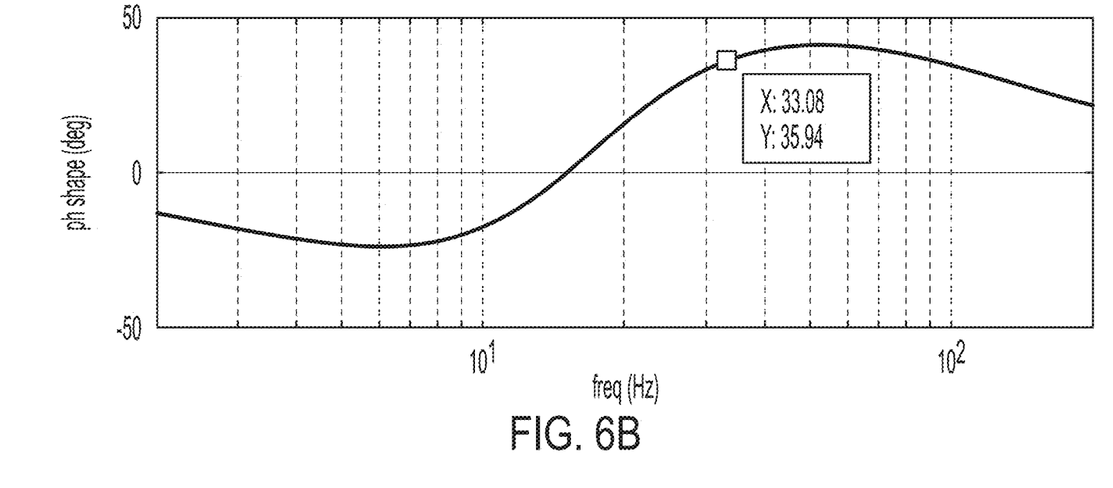

FIGS. 6A and 6B depict magnitude and phase angle, respectively, of a Bode plot of phase-shaping filter 48. The parameters $\omega_{ps1}$, $\omega_{ps2}$, $\omega_{ps3}$, $\zeta_{ps1}$, $\zeta_{ps2}$, were manually adjusted to provide proper phase relation over a broad bandwidth of frequencies. The iterated numerator parameters $\omega_{ps2}$ and $\zeta_{ps2}$ are a 17 Hz natural frequency with a 0.7 damping ratio. The two denominator corner frequencies $\omega_{ps1}$ and $\omega_{ps3}$ are 10.5 and 80 Hz. The phase at 33 Hz is approximately +36 degrees.

Figure 7A:
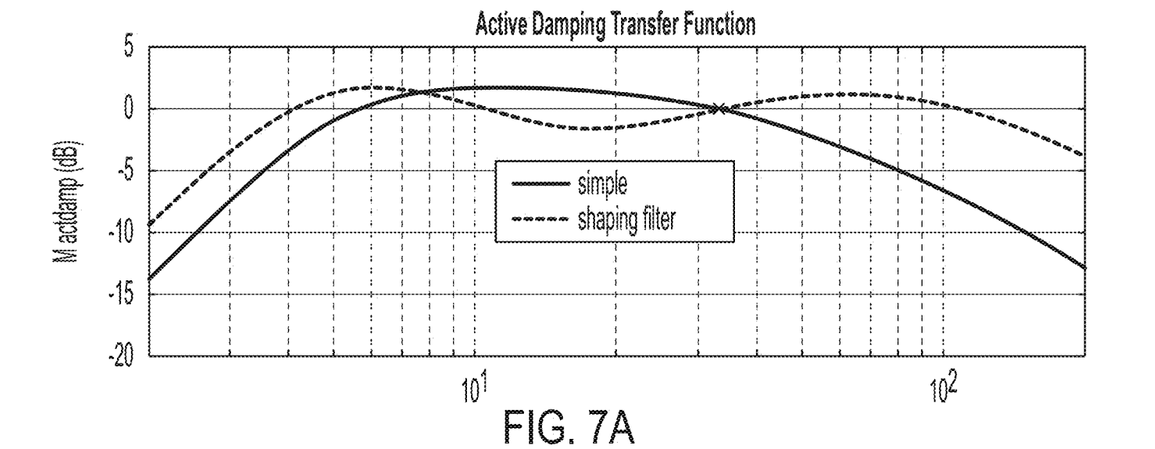
FIGS. 7A and 7B depict magnitude and phase angle, respectively, of a Bode plot of the overall active damping algorithm as described above with reference to FIG. 2.
Figure 7B:
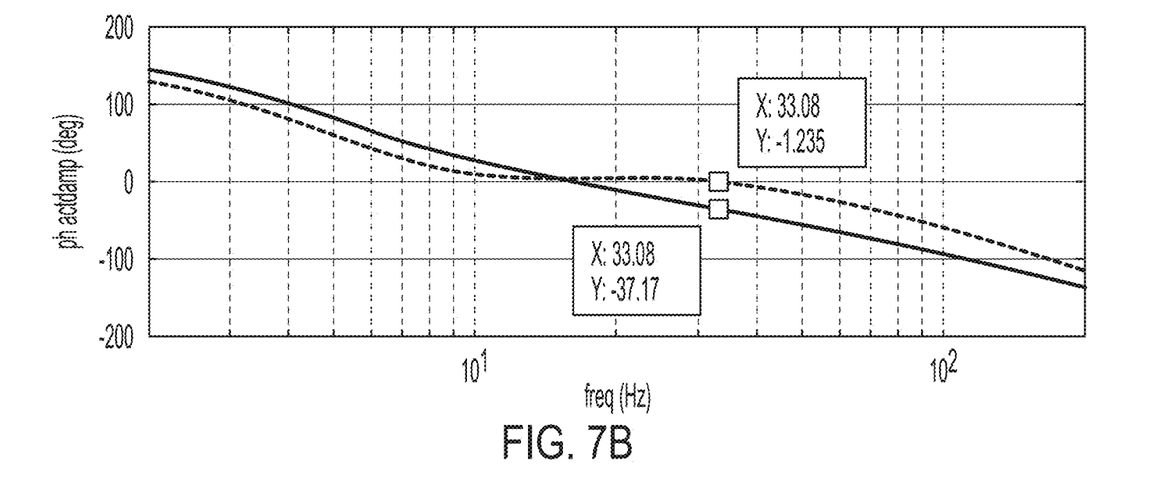

FIGS. 7A and 7B depict magnitude and phase angle, respectively, of a Bode plot of the overall active damping algorithm as described above with reference to FIG. 2. The prior art had only a simple double lag phase shaping filter with no capability to add phase lead as do the embodiments depicted in FIGS. 1-2. As shown in the figure, the phase for the prior art algorithm is approximately −37 degrees, but using the phase-shaping filter, the algorithm with the phase shaping filter is approximately −1 degree. Although, in the depicted embodiment, the overall phase is very near zero from about 10 to 40 Hz, other phase/frequency relations can be obtained using other filter coefficients. The phase/frequency relation can be tailored to the specific load suite corresponding to a specific aircraft. For example, a load suite for one type of aircraft could require a phase −55 degrees at 25 Hz and a phase of −30 degrees at 38 Hz. Depending on the nature of the electrical loads of a load suite, (e.g., for variable speed motor drive loads), the algorithm's overall phase might need to be lagging by up to 45 degrees or so at certain frequencies. This controlled phase/frequency region encompasses a 4:1 frequency range, which should be sufficient to encompass load suites over a reasonable range of drivetrain frequencies.

Note that, in the FIGS. 7A-7B depictions, the phase shaping filter parameters for the referenced example were tuned to yield an approximately constant transfer function phase over the frequency range from 10 to 40 Hz. Other embodiments with control the phase/frequency relation to be within a delta phase of a phase target corresponding to a specific load suite for an aircraft. The phase target can be a function of frequency. As seen in FIG. 5, the resulting overall algorithm transfer function gain varies about 2:1 over the frequency range from about 5 to 50 Hz. Other tunings that place more emphasis on maintaining a nearly constant transfer function gain are possible. Yet another tuning approach is to simulate the entire system, prime mover, mechanical driveline, generator(s), and loads. The damping of the dominant torsional resonant modes could then be determined from a linearized analysis of the system model and the algorithm tuning would strive to achieve acceptable mechanical torsional resonant modal damping for all load combinations across the generator operating speed range. These algorithm tuning approaches as well as many others can be achieved through a trial and error iterative process or could be automated through any of various search algorithms Discussion of Possible Embodiments The following are non-exclusive descriptions of possible embodiments of the present invention.

Apparatus and associated methods relate to a system for actively damping mechanical oscillations of a generator's drivetrain. The system includes a synchronous generator operatively connectable to receive, via the drivetrain, mechanical output from a prime mover and to provide electrical power in response to the mechanical output received. The system includes means for sensing the mechanical oscillations of the drivetrain. The system also includes a generator control unit (GCU) configured to selectively control an excitation signal that has a DC component and an AC component. The DC component is configured to maintain a magnitude of an output voltage of the electrical power provided. The AC component is configured to actively dampen the mechanical oscillations of a generator's drivetrain. The GCU controls, in response to the mechanical response of the drivetrain sensed, the AC component such that a phase relation of the AC component and the mechanical oscillations of the drivetrain are within a delta phase limit of a phase target over a frequency band from a lower-frequency limit through a higher-frequency limit. A ratio of the higher-frequency to lower-frequency limits exceeding 2:1.

The system of the preceding paragraph can optionally include, additionally and/or alternatively, any one or more of the following features, configurations and/or additional components:

A further embodiment of the foregoing system, wherein the phase target can be a function of frequency and is between −60 degrees and zero degrees.

A further embodiment of any of the foregoing systems, wherein the delta phase is +/−5 degrees.

A further embodiment of any of the foregoing systems, wherein the ratio of the higher-frequency to lower-frequency limits exceeds 3:1.

A further embodiment of any of the foregoing systems, wherein the drivetrain can include a rotatable shaft.

A further embodiment of any of the foregoing systems, wherein the synchronous generator can include a permanent magnet generator, an excitation generator, a rectifier, and a main generator. The permanent magnet generator can have a permanent magnet coupled to the rotatable shaft and configured to generate AC power in a stator in response to rotation of the rotatable shaft. The AC power can have a frequency indicative of a frequency of rotation of the rotatable shaft. The excitation generator can have an armature coupled to the rotatable shaft and configured to generate an AC excitation power signal in response to a DC magnetic field generated by an electromagnetic stator through which the excitation signal is conducted. The rectifier can be coupled to the rotatable shaft and configured to convert the AC excitation power signal to a DC excitation power signal. The main generator can have an electromagnetic rotor configured to generate a DC magnetic field based on the DC excitation power signal received from the rectifier. The main generator can be configured to generate AC power in field windings of a stator in response to rotation of the rotatable shaft.

A further embodiment of any of the foregoing systems, wherein the mechanical oscillations of the generator's drivetrain include torsional oscillations of the rotatable shaft.

A further embodiment of any of the foregoing systems, wherein the means for sensing a mechanical response of the drivetrain to the mechanical input received can include means for sensing rotation of the rotatable shaft.

A further embodiment of any of the foregoing systems, wherein the rotation of the rotatable shaft can be sensed by determining a frequency of AC electrical power generated by a permanent magnetic generator coupled to the rotatable shaft.

A further embodiment of any of the foregoing systems, wherein the GCU can include a low-pass filter, a high-pass filter configured, and a phase-shaping filter configured to filter a signal indicative of the mechanical response sensed.

A further embodiment of any of the foregoing systems, wherein the signal indicative of the mechanical response sensed as filtered by the low-pass, high-pass, and phase-shaping filters can be used to generate the AC component of the excitation signal.

A further embodiment of any of the foregoing systems, wherein the phase-shaping filter is a second order lag/lead filter having frequency response:

$$G_{ps} = \frac{s^2 + 2\zeta_{ps2}\omega_{ps2} \cdot s + \omega_{ps2}^2}{s^2 + 2\zeta_{ps1}\omega_{ps1} \cdot s + \omega_{ps1}^2}.$$

Some embodiments relate to a method for actively damping mechanical oscillations of a generator's drivetrain. The method includes receiving, via the drivetrain, mechanical input from a prime mover. The method includes providing, via a synchronous generator operatively connectable to the drivetrain, electrical power in response to the mechanical input received. The method includes sensing a mechanical response of the drivetrain to the mechanical input received. The method also includes selectively controlling, via a generator control unit (GCU), an excitation signal that has a DC component and an AC component. The DC component is configured to maintain a magnitude of an output voltage of the electrical power provided. The AC component is configured to actively dampen the mechanical oscillations of a generator's drivetrain. Selectively controlling the excitation signal includes controlling a phase relation of the AC component and the mechanical oscillations of the drivetrain to be within a delta phase limit of a phase target over a frequency band from a lower-frequency limit through a higher-frequency limit. A ratio of the higher-frequency to lower-frequency limits exceeds 2:1.

The method of the preceding paragraph can optionally include, additionally and/or alternatively, any one or more of the following features, configurations and/or additional components:

A further embodiment of the foregoing method, wherein the phase target can be a function of frequency and is between −60 degrees and zero degrees.

A further embodiment of any of the foregoing methods, wherein the delta phase can be +/−5 degrees.

A further embodiment of any of the foregoing methods, wherein the ratio of the higher-frequency to lower-frequency limits can exceed 3:1.

A further embodiment of any of the foregoing methods, wherein sensing a mechanical response of the drivetrain to the mechanical input received can include sensing rotation of a rotatable shaft of the drivetrain A further embodiment of any of the foregoing methods.

A further embodiment of any of the foregoing methods, wherein the mechanical oscillations of the generator's drivetrain can include torsional oscillations of the rotatable shaft.

A further embodiment of any of the foregoing methods, wherein sensing a mechanical response of the drivetrain to the mechanical input received can include sensing rotation of the rotatable shaft.

A further embodiment of any of the foregoing methods, wherein sensing rotation of the rotatable shaft can include determining a frequency of AC electrical power generated by a permanent magnetic generator coupled to the rotatable shaft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for actively damping mechanical oscillations of a generator's drivetrain, the system comprising:
   a synchronous generator operatively connectable to receive, via the drivetrain, mechanical output from a prime mover and to provide electrical power in response to the mechanical output received;
   means for sensing the mechanical oscillations of the drivetrain; and
   a generator control unit (GCU) configured to selectively control an excitation signal that has a DC component and an AC component, the DC component configured to maintain a magnitude of an output voltage of the electrical power provided, the AC component configured to actively dampen the mechanical oscillations of a generator's drivetrain, wherein the generator control unit includes a low-pass filter, a high-pass filter, and a phase-shaping filter configured to filter a signal indicative of the mechanical response sensed to generate the AC component of the excitation signal;
   wherein the GCU controls, in response to the mechanical oscillations of the drivetrain sensed, the AC component such that a phase relation of the AC component and the mechanical oscillations of the drivetrain are within a delta phase limit of a phase target over a frequency band having a lower-frequency limit and a higher-frequency limit, a ratio of the higher-frequency limit to the lower-frequency limit exceeding 2:1.

2. The system of claim 1, wherein the phase target is a function of frequency and is between −60 degrees and zero degrees.

3. The system of claim 1, wherein the delta phase limit is +/−5 degrees.

4. The system of claim 1, wherein the ratio of the higher-frequency to lower-frequency limits exceeds 3:1.

5. The system of claim 1, wherein the drivetrain includes: a rotatable shaft.

6. The system of claim 5, wherein the synchronous generator includes:
   a permanent magnet generator having a permanent magnet coupled to the rotatable shaft and configured to generate AC power in a stator in response to rotation of the rotatable shaft, the AC power having a frequency indicative of a frequency of rotation of the rotatable shaft;
   an excitation generator having an armature coupled to the rotatable shaft and configured to generate an AC excitation power signal in response to a DC magnetic field generated by an electromagnetic stator through which the excitation signal is conducted;
   a rectifier coupled to the rotatable shaft and configured to convert the AC excitation power signal to a DC excitation power signal;
   a main generator having an electromagnetic rotor configured to generate a DC magnetic field based on the DC excitation power signal received from the rectifier, the main generator configured to generate AC power in field windings of a stator in response to rotation of the rotatable shaft.

7. The system of claim 5, wherein the mechanical oscillations of the generator's drivetrain include torsional oscillations of the rotatable shaft.

8. The system of claim 5, wherein the means for sensing a mechanical response of the drivetrain to the mechanical input received includes:

means for sensing rotation of the rotatable shaft.

9. The system of claim 8, wherein the rotation of the rotatable shaft is sensed by determining a frequency of AC electrical power generated by a permanent magnetic generator coupled to the rotatable shaft.

10. The system of claim 1, wherein the phase-shaping filter is a second order lag/lead filter having frequency response:

$$G_{ps} = \frac{s^2 + 2\zeta_{ps2}\omega_{ps2} \cdot s + \omega_{ps2}^2}{s^2 + 2\zeta_{ps1}\omega_{ps1} \cdot s + \omega_{ps1}^2}.$$

11. A method for actively damping mechanical oscillations of a generator's drivetrain, the method comprising:

receiving, via the drivetrain, mechanical input from a prime mover;

providing, via a synchronous generator operatively connectable to the drivetrain, electrical power in response to the mechanical input received;

sensing a mechanical oscillation of the drivetrain to the mechanical input received; and selectively controlling, via a generator control unit (GCU), an excitation signal that has a DC component and an AC component, the DC component configured to maintain a magnitude of an output voltage of the electrical power provided, the AC component configured to actively dampen the mechanical oscillations of a generator's drivetrain, wherein the generator control unit includes a low-pass filter, a high-pass filter, and a phase-shaping filter configured to filter a signal indicative of the mechanical response sensed to generate the AC component of the excitation signal;

wherein selectively controlling the excitation signal includes:

controlling a phase relation of the AC component and the mechanical oscillations of the drivetrain to be within a delta phase limit of a phase target over a frequency band having a lower-frequency limit and a higher-frequency limit, a ratio of the higher-frequency limit to the lower-frequency limit exceeding 2:1.

12. The method of claim 11, wherein the phase target is a function of frequency and is between −60 degrees and zero degrees.

13. The method of claim 11, wherein the delta phase is +/−5 degrees.

14. The method of claim 11, wherein the ratio of the higher-frequency to lower-frequency limits exceeds 3:1.

15. The method of claim 11, wherein sensing a mechanical response of the drivetrain to the mechanical input received includes:

sensing rotation of a rotatable shaft of the drivetrain.

16. The method of claim 15, wherein the mechanical oscillations of the generator's drivetrain include torsional oscillations of the rotatable shaft.

17. The method of claim 15, wherein sensing a mechanical response of the drivetrain to the mechanical input received includes:

sensing rotation of the rotatable shaft.

18. The method of claim 17, wherein sensing rotation of the rotatable shaft includes:

determining a frequency of AC electrical power generated by a permanent magnetic generator coupled to the rotatable shaft.

* * * * *